Patented May 29, 1951

2,555,298

UNITED STATES PATENT OFFICE 2,555,298

DIMETHYLSTYRENE POLYMERS AND
PROCESS OF PRODUCING SAME

Murray Gray Sturrock, Pittsburgh, Pa., and Thomas Lawe, Montreal, Quebec, Canada, assignors to Dominion Tar & Chemical Company Limited, Montreal, Quebec, Canada No Drawing. Application September 11, 1948,
Serial No. 48,938

7 Claims. (Cl. 260—93.5)

This invention relates to polymers of 2,4- and 2,5-dimethylstyrenes, and to the production thereof. More particularly, our invention is directed to the production of polymers of pure 2,4- and 2,5-dimethylstyrenes.

Previously, polymerization of dimethylstyrenes has been proposed but the dimethylstyrenes employed for polymerization were so impure that the polymers obtained were not of any particular utility. In some cases, for example, they were not suitable for use as thermoplastics since insoluble and infusible polymers were obtained when the polymerization was carried to an advanced stage, or viscous liquid materials were obtained when the polymerization could not be conducted satisfactorily.

Polystyrene has many desirable physical and chemical properties which render it suitable for the production of many different molded articles. Inasmuch as polystyrene possesses a very low power factor over a very wide range of frequency, it has been used extensively in various electronic applications such as radio and radar. Unfortunately its use for such purposes has been limited by its relatively poor heat resistance. In many electrical applications of molded plastics there is a possibility of the temperature becoming relatively high from heat generated in resistance coils and by electronic tubes, batteries, etc. If articles molded of polystyrene are subjected to even moderately high temperatures, they distort because of internal strains if they have been injection molded and, in any event, they distort if subjected to any load while heated. Accordingly, in spite of the excellent electrical properties of polystyrene, its use in the electronic fields has been limited because of its inability to withstand either ordinary or unusual heating which may occur.

Inasmuch as polystyrene is transparent, readily colored to various pastel shades, relatively strong and easily molded, it has found wide use in the manufacture of novelties. Its use in the manufacture of various household articles such as tableware, however, has been limited by its poor heat resistance even though polystyrene is otherwise particularly suited to this application since it has high water resistance, i. e. it does not absorb moisture and is therefore not affected by changes in humidity. For this same reason, polystyrene does not become discolored or readily distorted as is the case with many other plastics. However, since molded polystyrene cannot be subjected to hot water without risking distortion, it is not suitable for those purposes which require contact with hot water.

We have found, according to the present invention, that certain polymerized dimethylstyrenes when molded possess most of the advantages of polystyrene without its chief disadvantage, i. e., poor heat resistance. The dimethylstyrene products possess low density, satisfactory physical strength, excellent electrical properties, and a heat distortion well above the boiling point of water.

An object of the present invention is to prepare polymeric thermoplastic materials which are suitable for molding and particularly, for injection molding.

Another object of the present invention is to provide a thermoplastic having the desirable properties of polystyrene and, in addition, a sufficiently high softening point to withstand hot water, i. e., water at temperatures of about 90°–100° C.

Still another object of our invention is to provide a thermoplastic resin having a low density.

Still another object of our invention is the production of crystal-clear plastics with a high refractive index.

A further object of our invention is to provide a plastic which is of sufficient purity that molded articles produced therefrom have relatively high strength and do not craze during the life of the molded article.

One other object of our invention is to provide a plastic which is easily molded by continuous procedures such as injection or extrusion molding, as well as by compression molding.

The above and other objects are attained by polymerizing 2,4- or 2,5-dimethylstyrenes in a substantially pure state. The 2,4- and 2,5-dimethylstyrenes which are suitable for use in accordance with our invention are those which have a melting point range of not more than 3° C. and an optical exaltation of at least one.

It is a special advantage of the present invention that by its process polymerized dimethylstyrenes are obtained which are soluble and fusible even when polymerization is carried to an advanced stage.

The following examples in which the proportions are in parts by weight are given by way of illustration and not in limitation.

Example 1

Stabilized 2,4-dimethylstyrene is flash-distilled from an aqueous solution of sodium hydroxide and dried over anhydrous sodium sulfate. The product, which melts at —64.5 to —62° C. and has an optical exaltation of about 1.70, is heated for 6–7 days in the absence of air and catalyst. At the end of this time, a hard clear resin is obtained. The resin is broken up in small pieces by impact and heated in a vacuum for 20 hours at 90°–100° C. to remove any traces of unpolymerized monomer.

The intrinsic viscosity of the polymer, calculated according to the formula $\log_e \eta_r/C$ where $\eta_r$ is the viscosity of a dilute (1%) solution of the polymer in toluene divided by the viscosity of toluene in the same units, and C is the concentration, in grams, of polymer in 100 cc. of solution, is 0.68. Its A. S. T. M. plasticity, determined on a Peakes-Rossi machine, is 149° C.

The molding material prepared in the manner described above is placed in a compression mold, preheated for 5 minutes, and then molded at 160°–170° C. at a pressure of 2000–3000 pounds per square inch for 2–5 minutes. The molded material is cooled in the mold to near room temperature and ejected. The molded article is clear, colorless and transparent, and it has high hardness and gloss.

Standard A. S. T. M. bars ½" x ½" x 5" are molded, and the heat distortion of these bars is determined under standard A. S. T. M. conditions. The heat distortion is found to be 103°–105° C. This indicates that moldings produced from the polymeric 2,4-dimethylstyrene produced in accordance with this example can be safely subjected to boiling water. Polystyrene, on the other hand, made under the same conditions as those described in this example has a maximum heat distortion of about 77°–80° C.

When a bar of the molded 2,4-dimethylstyrene of the type described above is boiled in water under a 2 kilogram load over a 5" span, no distortion occurs, whereas under similar conditions a similar bar of molded polystyrene distorts markedly.

The density of the polymerized 2,4-dimethylstyrene is about 1.05–1.1, and the Izod impact strength of compression moldings is 0.18 ft. lbs. per inch of notch.

EXAMPLE 2

2,4-dimethylstyrene stabilized with hydroquinone is washed three times with a 3% sodium hydroxide solution, rinsed thoroughly with demineralized water and dried over anhydrous sodium sulfate. It is then flash-distilled at 76° C. at 3 mm., and the product has an optical exaltation greater than one and a melting point range of less than 3° C.

The distilled 2,4-dimethylstyrene is placed under an atmosphere of carbon dioxide in a suitable vessel and subjected to the following temperature cycle: 80°–81° C. for 24 hours, 100° C. for 40 hours, 120°–122° C. for 6½ hours, and 170° C. for 1 hour.

After cooling the polymer is removed from the reaction vessel, broken up into small pieces and then cut into a molding powder. This molding powder is vacuum dried for 48 hours at 95° C. and for 48 hours at 125° C. to remove any monomer present.

A tensile bar, a 4" dish, and an impact bar are molded on an automatic cycle in a Watson-Stillman standard injection molding machine under the following conditions:

|  | Tensile Bar | 4" Dish | Impact Bar |
|---|---|---|---|
| Cycle in sec.[1] | 0—65—5—25 | 0—45—5—25 | 0—210—5—35 |
| Mold Temperature °C. | 75 | 75 | 72 |
| Cylinder Temperature °C. | 390 | 420 | 410 |
| Pressure on Material, p. s. i. | 34,000 | 35,000 | 28,000 |

[1] The first figure in the molding cycle column is the time required for the clamping ram to start forward; the second, the time for the clamping ram to start to open; the third is the time after the mold has closed and the injection ram moves forward; the fourth, the time the injection ram maintains pressure on the piece in the mold.

The molded 2,4-dimethylstyrene polymer has an intrinsic viscosity at 0.5% of 1.2, a heat distortion of 107° C., and a Peakes flow of 168° C. The surfaces of the molded pieces exhibit no signs of crazing after two weeks, and only slight crazing after two months.

Upon comparison with corresponding properties of polystyrene, it will be apparent that injection molded poly-2,4-dimethylstyrene is substantially equivalent to polystyrene in all respects except heat distortion, in which it is far superior.

EXAMPLE 3

2,5-dimethylstyrene is distilled as described in Example 1 to remove the stabilizer. The dimethylstyrene has a melting point of about —36.8° C. to —34.8° C. and an optical exaltation of about 1.54. This 2,5-dimethylstyrene is polymerized in the same manner as described in Example 1 for the 2,4-dimethylstyrene, and the resulting polymer is found to have an intrinsic viscosity of about 1.06 and a Peakes plasticity of 156° C. The A. S. T. M. heat distortion is 106° C.

Comparative Example 1

3,4-dimethylstyrene is purified in the same manner as described in Example 1. It has a melting point of —41.6° to —40.4° C. and an optical exaltation of about 1.91. The 3,4-dimethylstyrene is polymerized in the same manner as described in Example 1 to produce a polymer having an intrinsic viscosity of 1.49 and a Peakes plasticity of 141° C. The A. S. T. M. heat distortion of this product is 81°–82° C., only slightly higher than that of polystyrene.

Comparative Example 2

Example 3 is repeated except that purified 3,4-dimethylstyrene is substituted for the 2,5-dimethylstyrene. The resulting polymer has an intrinsic viscosity of 1.39 and a Peakes plasticity of 144° C. On the other hand, the A. S. T. M. heat distortion of compression molded bars is 83° C.

The results of Examples 1, 2, and 3, when compared with the results of Comparative Examples 1 and 2, show that 3,4-dimethylstyrene has relatively low heat resistance, while the 2,4- and 2,5-dimethylstyrenes have high heat resistance. While we do not wish to be limited to any particular theory accounting for this difference in heat resistance of the isomers, we believe that the relatively high heat resistance of the 2,4- and and 2,5-isomers is due to the presence of a methyl group in ortho position to the vinyl group. This methyl group in the 2-position does not necessarily indicate a satisfactory polymerized dimethylstyrene of high heat resistance, however, as will be evident from the following comparative example.

*Comparative Example 3*

100 parts of 2,6-dimethylstyrene containing inhibitor are flash steam distilled from 3% sodium hydroxide solution and dried over 10 parts of anhydrous sodium sulfate. Equal portions of the pure 2,6-dimethylstyrene and of 2,4-dimethylstyrene similarly treated are placed in two suitable vessels and covered in an atmosphere of carbon dioxide. The vessels are then placed in an oven at 100° C. The following observations are made:

| Time in oven | 2,6-dimethylstyrene | 2,4-dimethylstyrene |
|---|---|---|
| few hours | no viscosity increase | viscosity increase. |
| 24 hours | slight viscosity increase and addition to aliquot of methanol* precipitated only a small portion of oily, low polymer. | |
| 6 days | no significant viscosity increase | completely polymerized. |

*Quantity of methanol-insoluble material in measure of extent of polymerization or conversion of the monomer.

An additional portion of 2,6-dimethylstyrene is refluxed at 184° C. for 48 hours under an atmosphere of carbon dioxide. Increased viscosity is observed but there is very little darkening in color, and methanol addition separates only about 25% as an oily polymer.

It will be apparent from the above results that the 2,6-dimethylstyrene will not form a useful solid high polymer and the fact that there is a methyl group in the 2-position to provide high heat resistance is of no avail.

EXAMPLE 4

6 parts of polyvinyl alcohol are dissolved in 1420 parts of water and to this solution is added 0.09 part of melamine and 80 parts of 0.1% aqueous solution of potassium persulfate. 300 parts of 2,4-dimethylstyrene, in which 0.6 part of benzoyl peroxide is dissolved, are added to the polyvinyl alcohol solution. The two solutions are agitated to produce a dispersion which is charged into a steam heated kettle and the reaction mixture is heated for 24 hours at 100° C. At the end of this period, steam is added directly to the reaction mixture, and any unreacted hydrocarbon distills out. This usually amounts to less than 1%.

The polymer, which is in the form of fine beads less than 1 mm. in diameter, is filtered, steeped in cold water, and the water is gradually raised to boiling. The polymer is filtered hot. This process of steeping in water, heating, and filtering is repeated three times. The polymer is then centrifuged and dried for 48 hours in a vacuum at 100° C. The Peakes plasticity of the compound under standard A. S. T. M. conditions is 146° C. and its intrinsic viscosity is 0.63. On compression molding of the polymer, clear pale yellow moldings are obtained. Standard A. S. T. M. moldings, ½″ x ½″ x 5″, possess a heat distortion of 102°–103° C. and an Izod impact strength of 0.187 ft. lbs. per inch of notch.

EXAMPLE 5

1.5 parts of polyvinyl alcohol are dissolved in 750 parts of water and 20 parts of 0.1% solution of potassium persulfate is added. To 75 parts of 2,5-dimethylstyrene, 0.15 part of benzoyl peroxide is added and the resulting solution is mixed and agitated with the solution of polyvinyl alcohol until a dispersion is formed. This dispersion is heated under reflux with agitation for 24 hours at about 100° C., after which it is steamed to remove any unreacted dimethylstyrene. This amounts to less than about 1%.

The polymer of the 2,5-dimethylstyrene, which is formed in the shape of small beads of about 2-2.5 mm. in diameter, is washed by immersion in cold water which is gradually heated to boiling, after which the polymer is filtered while hot. This operation is repreated three times, the product is centrifuged and then dried in a vacuum for about 48 hours at a temperature of about 100° C. The intrinsic viscosity of the polymer is 0.69, while the Peakes plasticity is 150° C. Compression moldings are clear light yellow colored articles having high gloss and hardness.

The A. S. T. M. heat distortion on standard A. S. T. M. compression molded bars is about 105° C.

Examples 4 and 5 merely illustrate that the 2,4- and 2,5-dimethylstyrenes may be emulsion or dispersion polymerized as well as in bulk.

We have made the surprising discovery, according to the present invention, that not only must a dimethylstyrene be substantially pure in order for polymers thereof to be soluble solid thermoplastics suitable for molding to produce articles having a high heat distortion, but only two of the known dimethylstyrene isomers will polymerize to such useful products regardless of the purity of the monomer. It has been demonstrated by Comparative Example 3 that 2,6-dimethylstyrene will not even polymerize to a high molecular weight product having desired properties of solubility, fusibility and adaptability to be molded into useful articles, and by Comparative Examples 1 and 2 that while, 3,4-dimethylstyrene polymerizes to form such high molecular weight products, moldings of the polymer have relatively low heat distortion.

The present invention relates to polymers of relatively high molecular weight. Such polymers are normally solid, and they are soluble and thermoplastic. They have an intrinsic viscosity of at least 0.1 and generally much higher.

Polymerization of 2,4- and 2,5-dimethylstyrenes is carried out, according to the present invention, at any temperature which gives the desired rate of reaction and at the same time produces the desired type of polymer. Thus, the temperature may be varied over wide ranges such as, for example, from 20° C. (about 20° C.) to 200° C. (about 200° C.) or more. In order to obtain rapid polymerization of 2,4- and 2,5-dimethylstyrenes if emulsion or dispersion polymerization is contemplated, the reaction temperatures are preferably maintained between 70° C. (about 70° C.) and 100° C. (about 100° C.). On the other hand, if bulk polymerization of the dimethylstyrenes is contemplated, the polymerization temperature is preferably from 90° C. (about 90° C.) to 120° C. (about 120° C.). Lower polymerization temperatures tend to increase the molecular weight of the polymer, but this is attended by lower conversion of the dimethylstyrene and a relatively lower heat distortion with no compensating increase in physical strength. Heat distortion apparently depends, at least in part, on the degree of conversion which can be measured by the methanol solubles in the polymer.

In order to increase the rate of polymerization of 2,4- and 2,5-dimethylstyrenes according to the present invention, a small proportion, e. g., 0.1%–5% of a polymerization catalyst such as an organic peroxide or a hydrogen peroxide, may be used. Hydrogen peroxide may be incorporated in the aqueous phase of emulsions or dispersions of 2,4- and 2,5-dimethylstyrenes, and other water-soluble polymerization catalysts such as the persulfates, percarbonates, perborates, etc., may be employed similarly. Organic peroxides may be incorporated with the dimethylstyrenes themselves. Examples of suitable organic peroxides are benzoyl peroxide, benzoyl acetic peroxide, lauroyl peroxide, oleic peroxide, stearic peroxide, acetic peroxide, tertiary butyl hydroperoxide, etc. Polymerization promoters may be used in conjunction with the polymerization catalyst if desired. However, if light colored products are desired, the polymerization should preferably be carried out in the absence of any polymerization catalyst and with the exclusion of air.

2,4- and 2,5-dimethylstyrenes may be polymerized as aqueous dispersions, suitable dispersing agents including talc, calcium phosphate, styrene-maleic acid heteropolymers, dimethylstyrene-maleic acid heteropolymers, methyl cellulose, methyl starch, glycol cellulose, polyacrylamide, etc.

2,4- and 2,5-dimethylstyrenes may also be polymerized as aqueous emulsions, and for this purpose either anionic or cationic emulsifiers may be used. Examples of emulsifiers include sodium hydroxystearate, the sodium salts of long chain sulfated alcohols such as sodium lauryl sulfate, the sodium salts of organic sulfonates including the sodium salts of alkyl-substituted naphthalene sulfonic acids, the sodium salts of the alkyl esters of sulfosuccinic acid such as the sodium salt of the dioctyl ester of sulfosuccinic acid, dodecylamine hydrochloride, dodecylamine formate, quaternary ammonium compounds such as trimethylbenzylammonium chloride, etc. Mixtures of the various emulsifying agents may be employed, and it has been found that mixtures including a sodium salt of an alkyl ester of sulfosuccinic acid, such as the one mentioned above, with the sodium salt of an alkyl naphthalene sulfonic acid are specifically suitable.

The polymerization of 2,4- and 2,5-dimethylstyrenes in aqueous dispersion results in a relatively slow polymerization to give a polymer which precipitates during the reaction, whereas polymerization of the 2,4- and 2,5-dimethylstyrenes in emulsion form results in a more rapid polymerization and a polymer of somewhat higher molecular weight. Furthermore, the polymer obtained by emulsion polymerization generally remains dispersed and may either be used in the form of a dispersion or be coagulated to obtain a solid polymer.

The poly-2,4- and 2,5-dimethylstyrenes prepared in accordance with the present invention are soluble in typical polystyrene solvents, including benzene, toluene, xylene and other aromatic hydrocarbons, as well as the chlorinated derivatives thereof such as chlorobenzene, ethylenedichloride, etc., higher molecular weight ketones such as methyl ethyl ketone and esters such as butyl acetate, and the like.

They are also soluble in polystyrene non-solvents such as ethyl ether.

The 2,4- and 2,5-dimethylstyrenes used in accordance with our invention have a high degree of purity and contain substantially no unpolymerizable hydrocarbon. Suitable materials are those which melt within the range of not more than about 3° C. and have an optical exaltation of at least one. Such 2,4- and 2,5-dimethylstyrenes may be prepared in accordance with the process disclosed and claimed in our Patent No. 2,420,689 dated May 20, 1947. This process involves contacting asymmetric di(m-xylyl) ethane or asymmetric di(p-xylyl) ethane with a finely divided catalyst which promotes simple molecular decomposition, such as, for example, a hydrated aluminum silicate catalyst, at a temperature of at least 350° C.

2,4- and 2,5-dimethylstyrenes are preferably stabilized during storage to prevent polymerization, and for this purpose a small proportion of polymerization inhibitor, such as hydroquinone, is used. Prior to polymerization this polymerization inhibitor is preferably removed, either chemically or physically, and this is the purpose of the usual purification step recited in the examples. If the inhibitor is not removed, relatively larger proportions of polymerization catalyst should be used to bring about polymerization. Alternatively, polymerization retarders which decompose upon heating may be used to stabilize 2,4- and 2,5-dimethylstyrenes during storage, and a so-stabilized dimethylstyrene may be polymerized without a preliminary purification step.

Aqueous emulsions or solutions in organic liquid of 2,4- and 2,5-dimethylstyrene polymers may be used in the treatment of fibrous materials such as paper, textiles, leather, etc. The polymer may be applied in the form of a coating which is subsequently calendered to give a smooth water-resistant finish, or the polymer may be used to impregnate the material, for example, in order to increase its resistance to the passage of vapors and moisture therethrough.

Polymers of 2,4- and 2,5-dimethylstyrene produced in accordance with our invention may be formed into sheets by extrusion and, if desired, drawn to form products having high tensile strength.

While the polymers prepared according to the present invention are especially suitable for use in the production of molded articles which are clear and substantially transparent, dyes, pigments, or fillers may be incorporated with the polymer if desired. Our polymers may be employed in coating compositions such as paints, lacquers, enamels, varnishes, etc., and in such cases various other resins and plasticizers may be incorporated in the compositions.

This is a continuation-in-part of our copending application Serial No. 563,453 filed November 14, 1944 now abandoned.

We claim:

1. A process which comprises polymerizing a member of the group consisting of 2,4-dimethylstyrene and 2,5-dimethylstyrene, said member being substantially pure, melting within a range of 3° C., having an optical exaltation of at least one, and obtained by contacting a dixylyl ethane selected from the group consisting of asymmetric di(m-xylyl) ethane and asymmetric di(p-xylyl) ethane with a finely divided catalyst which promotes simple molecular decomposition at a temperature of at least 350° C. by maintaining said member at a temperature between about 20° C. and about 200° C. until a solid, fusible, soluble polymer having an intrinsic viscosity of at least 0.1 is obtained.

2. A process according to claim 1 in which said member is 2,4-dimethylstyrene.

3. A process according to claim 1 in which said member is 2,5-dimethylstyrene.

4. A process according to claim 1 in which the polymerization takes place in the presence of a polymerization catalyst.

5. A process according to claim 1 in which said member is polymerized in aqueous emulsion.

6. A process according to claim 1 in which said member is polymerized in aqueous dispersion.

7. A solid, fusible, soluble polymer prepared by maintaining a member of the group consisting of 2,4-dimethylstyrene and 2,5-dimethylstyrene, said member being substantially pure, melting within a range of 3° C., having an optical exaltation of at least one, and obtained by contacting a dixylyl ethane selected from the group consisting of asymmetric di(m-xylyl) ethane and asymmetric di(p-xylyl) ethane with a finely divided catalyst which promotes simple molecular decomposition at a temperature of at least 350° C. at a temperature between about 20° C. and about 200° C. until a product having an intrinsic viscosity of at least 0.1 is obtained.

MURRAY GRAY STURROCK.
THOMAS LAWE.

REFERENCES CITED

The following references are of record in the file of this patent:

UNITED STATES PATENTS

| Number | Name | Date |
|---|---|---|
| 1,676,281 | Ostromislensky | July 10, 1928 |
| 1,683,402 | Ostromislensky | Sept. 4, 1928 |
| 2,077,542 | Wulff et al. | Apr. 20, 1937 |
| 2,255,729 | Britton et al. | Sept. 9, 1941 |
| 2,269,810 | Driesbach | Jan. 13, 1942 |

FOREIGN PATENTS

| Number | Country | Date |
|---|---|---|
| 598,558 | Great Britain | Feb. 20, 1948 |

OTHER REFERENCES

Brajnikoff: Plastics (London), September 1942, pp. 316-328.